Oct. 21, 1969  H. W. DUBACH  3,473,383
SUBMERSIBLE BATHYTHERMOGRAPH
Filed April 25, 1967  3 Sheets-Sheet 2

INVENTOR
HAROLD W. DUBACH

BY
ATTORNEY

Oct. 21, 1969  H. W. DUBACH  3,473,383
SUBMERSIBLE BATHYTHERMOGRAPH
Filed April 25, 1967 3 Sheets-Sheet 3

INVENTOR
HAROLD W. DUBACH
BY
ATTORNEY

United States Patent Office 3,473,383
Patented Oct. 21, 1969

3,473,383
SUBMERSIBLE BATHYTHERMOGRAPH
Harold W. Dubach, 5908 85th Ave.,
Hyattsville, Md. 20784
Filed Apr. 25, 1967, Ser. No. 634,800
Int. Cl. G01k 1/08, 5/70, 1/02
U.S. Cl. 73—343        15 Claims

ABSTRACT OF THE DISCLOSURE

An apparatus for measuring the temperature of the ocean at various depths which is adapted to operate from the ocean floor. When the desired temperature measurements have been made the apparatus then rises to the ocean's surface to be retrieved along with the desired temperature information which is stored therein.

Statement of government interest

The invention described herein may be manufactured and used by or for the Government of the United States of America for governmental purposes without the payment of any royalties thereon or therefor.

Background of the invention

The present invention relates to a bathythermograph apparatus for determining the vertical temperature gradient in a body of water, such as an ocean, and more particularly to apparatus for determining the vertical temperature gradient from a submerged position on the ocean floor.

In the field of oceanography it has been the general practice to employ bathythermographs which operate or are controlled from the surface of the ocean, e.g. from ships or other surface platforms, to measure ocean temperature gradient in a vertical direction. Although such devices have served the purpose they have not proved entirely satisfactory under all conditions of service for the reason that considerable difficulty has been experienced in the use of these prior art devices from the ocean's surface when the weather and wave conditions become severe. As wind and waves increase in intensity the accuracy of the data recorded by bathythermographs which are controlled from surface platforms degenerates, becoming intermittent and laced with a variety of errors.

Summary of the invention

The general purpose of this invention is to provide a submersible bathythermograph adapted to function from the ocean floor which embraces all the advantages of similarly employed bathythermographs and possesses none of the aforedescribed disadvantages inherent in bathythermographs which are controlled from surface platforms. To attain this the present invention contemplates a unique apparatus whereby the apparatus, which is self-contained and self-operated, sinks to the ocean floor and at periodic and predetermined time intervals releases temperature sensors to the ocean's surface so as to measure the vertical temperature gradient. After a predetermined time has passed and each one of a plurality of sensors in the apparatus has been released to the surface, the apparatus rises to the ocean's surface to be retrieved with the desired temperature data recorded therein.

An object of the present invention is to provide a submersible bathythermograph which is capable of recording accurate ocean temperature data even under the most severe weather and wave conditions.

Another object is to provide a bathythermograph which is capable of recording water temperature data during hurricane and severe storm periods.

A further object of the invention is the provision of a bathythermograph which operates from the ocean floor so as to be unaffected in its operation by severe weather and wave conditions.

Still another object is to provide a submersible bathythermograph which floats to the ocean's surface at a predetermined time upon the completion of recording the desired ocean temperature data.

Yet another object of the present invention is the provision of a submersible bathythermograph which operates to provide a series of observations, the times of which can be preset into the apparatus and which can take place over a total time interval sufficient to record the passing of a hurricane or other severe weather conditions.

Other objects and many of the attendant advantages of this invention will be readily appreciated as the same becomes better understood by reference to the following detailed description when considered in conjunction with the accompanying drawings in which like reference numerals designate like parts throughout the figures.

Description of the preferred embodiments

Figure 1:
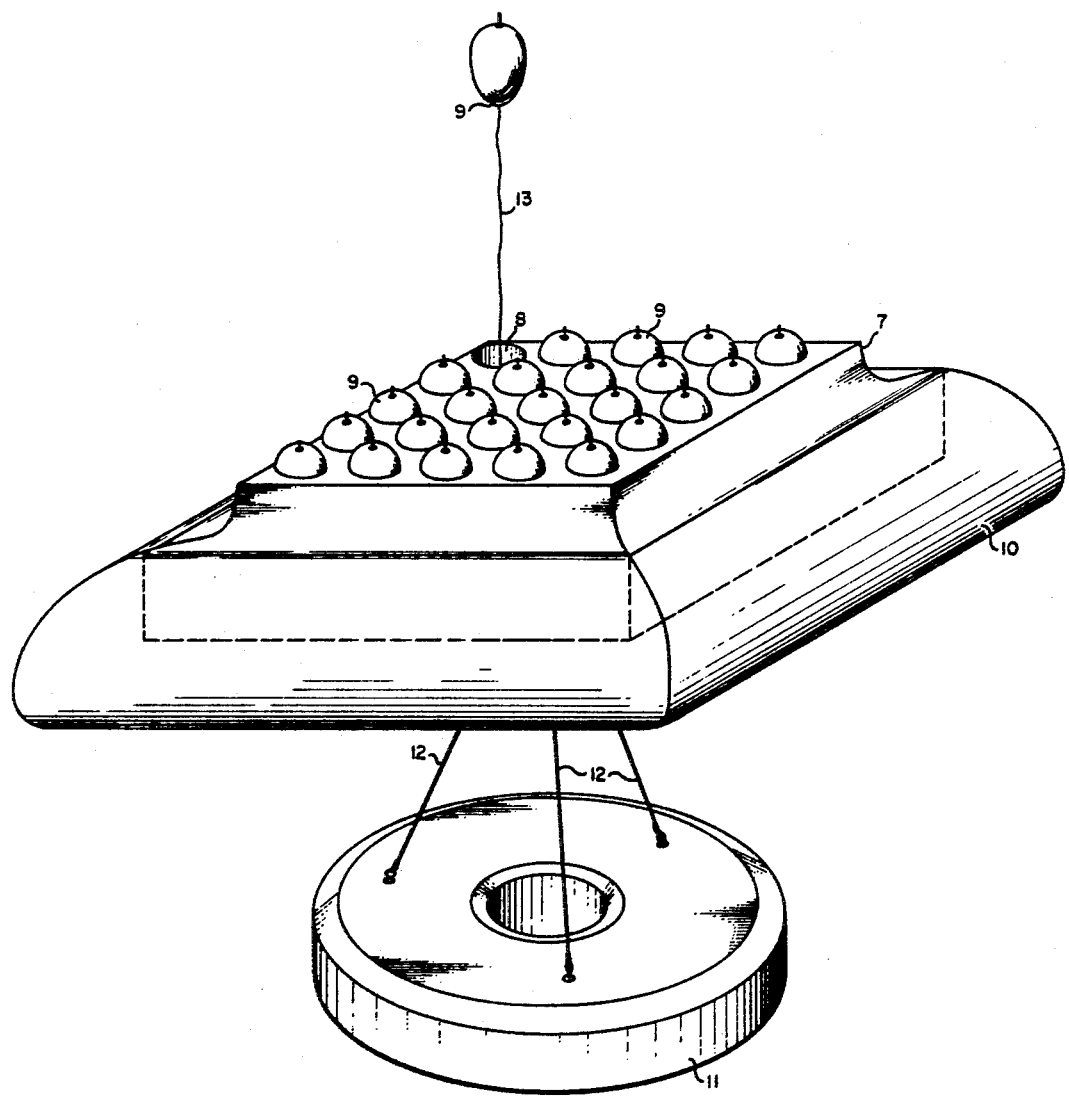
FIG. 1 shows a perspective view of a preferred embodiment of the invention.

Referring now to the drawings, there is shown in FIG. 1 a preferred embodiment of the apparatus which includes a water-tight instrument housing 7 which may be made of a material such as molded polyethylene. The housing 7 includes a plurality of depressions, one of which is represented by the numeral 8. Inserted in each of the depressions 8 is a flotation flask 9 which is normally hermetically sealed in its respective depression. A flotation material 10 is attached around the instrument housing 7 while a sinker 11 is attached by means of cables 12 to the instrument housing.

Figure 2:
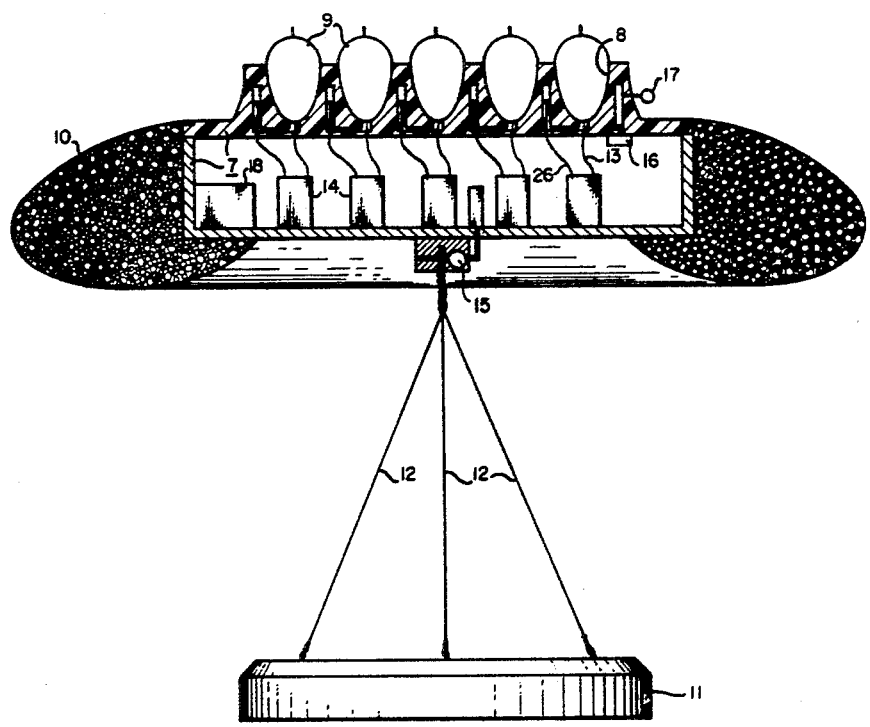
FIG. 2 illustrates a side elevation, partly in cross section, of the apparatus shown in FIG. 1.

With reference now to FIG. 2, each of the flotation flasks 9 is coupled by means of a wire 13 to its respective recorder 14. In addition, there is shown a cable cutter release assembly 15 which is adapted to sever the cables 12; and a control timing mechanism 16, which is adapted to control the release of the flasks 9 and the severing of the cables 12 by the cable cutter release assembly 15. FIG. 2 also shows a timing mechanism actuator 17, which is represented as being a pin which can be moved by a cord fixture (not shown) attached thereto so that at the time the bathythermograph is dropped into the ocean the pin 17 automatically engages the control timing mechanism 16 so as to cause a depth gauge 18 to record from the surface of the ocean to the ocean's floor, thus providing a permanent record of the depth of the ocean at the point from which the apparatus will operate. Although the timing actuator 17 is disclosed in FIG. 2 as a pin, various other actuators could be used to activate the control timing mechanism 16. For example, a wave pressure sensor could be used to start the control timing mechanism 16. The wave pressure sensor would be preset to respond to waves at the surface exceeding a predetermined height, e.g. if set at a pressure equivalent to waves 20 feet in height, the control timing mechanism 16 would be started when hurricane force winds produced waves of 20 feet or more. Sea-floor pressure transducers used to sense surface waves of predetermined heights would also be effective as actuators in comparatively shallow depths. Similarly, an acoustic sensor could be used as the timing actuator 17 which would respond to a small explosive charge dropped by an aircraft so as to detonate at a depth near the bathythermograph.

Figure 3:
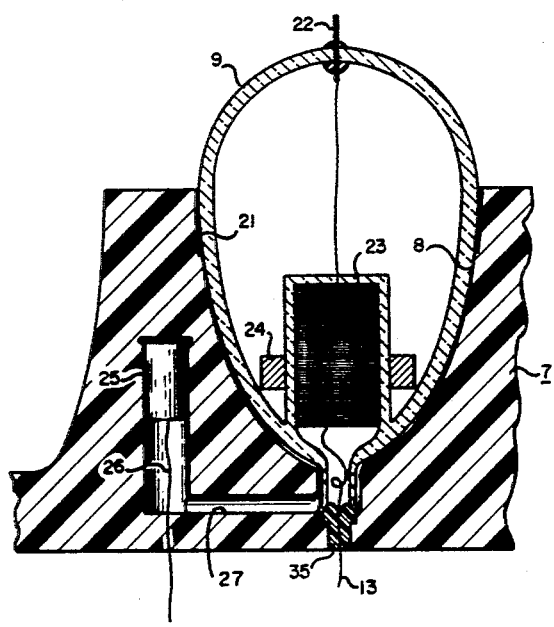
FIG. 3 shows a section of a portion of the device of FIG. 2.

Referring now to FIG. 3 there is shown a cross-sectional view of one of the flasks 9 where it is positioned in a depression 8 within the instrument housing 7. The flask 9 is fixed within the depression by a sealant 21 which hermetically seals the flask within the depression. Each of the flasks comprises a sensor 22 which extends outside of the flask, a wire spool 23 the wire of which is connected to the sensor 22, a lead ring 24 which may or may not be present to act as ballast, and a wire 13 which is connected to the respective recorder 14 of the flask. In addition, a detonation cartridge 25 to which a detonation wire 26 is attached is located within the instrument housing 7 and adjacent to the depression 8. A channel 27 is located between the depression 8 and the detonation cartridge 25 so that when the cartridge 25 is detonated the expanding gas therefrom will pass through the channel 27 and into the depression 8 so as to break the sealant 21 and allow the flask 9 to rise up out of the depression 8 to the ocean's surface. Although the flasks 9 are shown in the figures to be approximately oval in shape, other shapes can be used, e.g. spheres, which provide better pressure resistance when the bathythermograph is to be used at great depths. Also, the flasks 9 may be made of any appropriate material such as plastic or glass which will not be adversely affected by the corrosive environment present in salt water.

Figure 4:
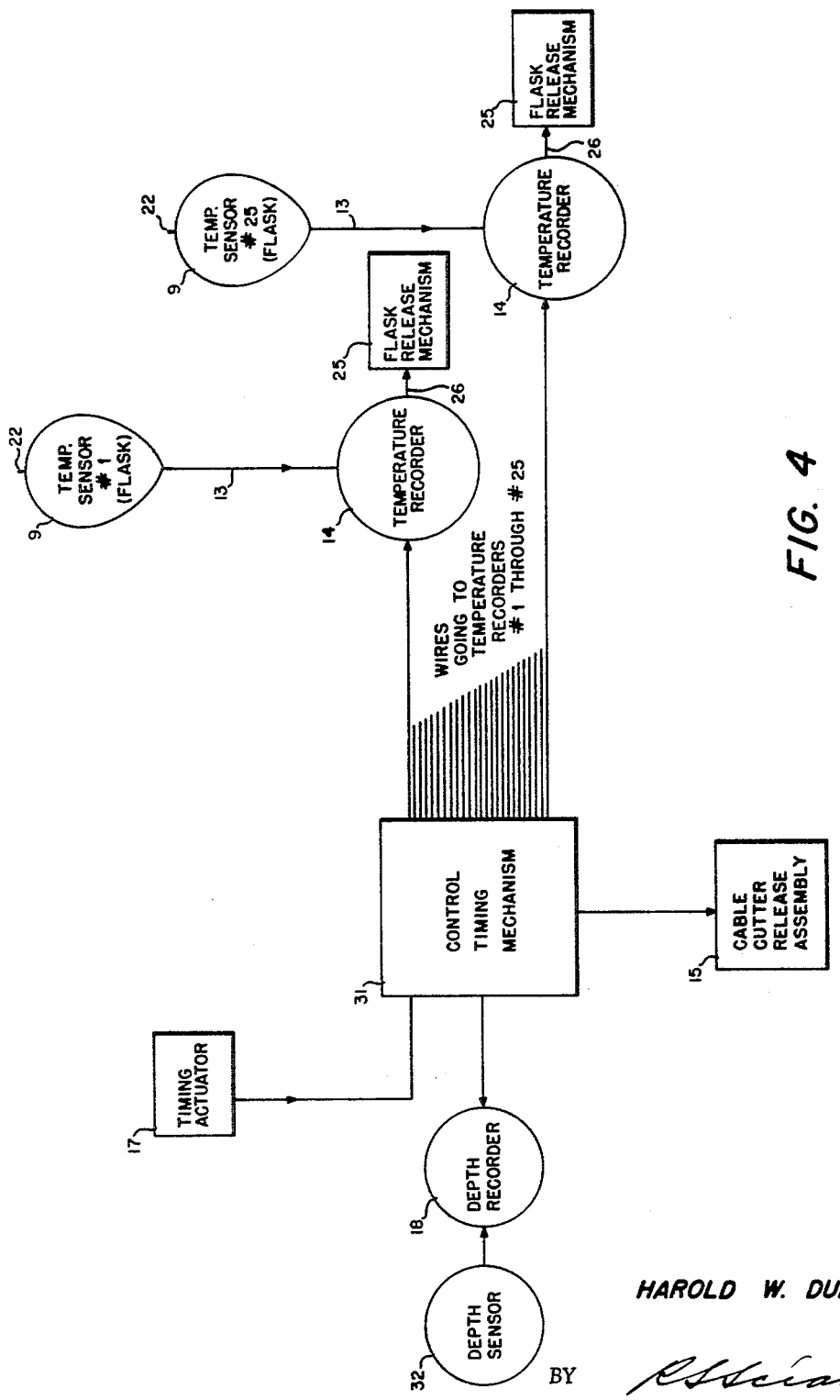
FIG. 4 is a block diagram of the control portion of the apparatus.

FIG. 4 illustrates the control system of the bathythermograph, the central and most important part of which is the control timing mechanism 31. When the bathythermograph is dropped into the water the timing actuator 17, which may be a release pin that is pulled by a line or by hand, automatically engages the control timing mechanism 31 so as to cause the depth sensor 32 to record on depth recorder 18 from the surface to the ocean floor, thus providing a permanent record of the depth of the ocean at the point at which the bathythermograph settles. At a predetermined time from when the timing actuator 17 has been activated the control timing mechanism 31 causes a first temperature recorder 14 to be activated and activates the flask release mechanism 25, which may be the detonation cartridge 25, so that the positively buoyant flotation flask 9 associated with the first temperature recorder 14 breaks loose from the housing 7 and rises from the bathythermograph and the ocean's bottom to the surface of the ocean.

As the flotation flask 9 rises because of its positive buoyancy, it pays out wire 13 from the internally mounted spool 23. The end of the wire 13 opposite from the flask 9 is securely attached to the housing 7 by means of air tight connector 35 and is electrically coupled to a respective temperature recorder 14. A thermistor 22 or other temperature sensing device which is mounted on the flotation flask 9, senses the ocean temperature as the flask rises and enables the recorder 14 to record the temperature information because the sensor 22 is coupled to the recorder 14 by means of wire 13. When the wire 13 is completely paid out from the spool 23, it will break free from the housing 7 and the recorder 14 will stop recording. Because the control timing mechanism 31 has a completely controlled timing sequence which is set into it before the bathythermograph is launched, the timing mechanism of 31, after a preset and predetermined time interval, activates a second temperature recorder 14 and the release mechanism 25 associated therewith. This again results in a second flask 9 rising up from the bathythermograph and the ocean bottom to the surface of the ocean to again measure and record the vertical temperature gradient. The control timing mechanism 31 is programmed so that the operating time of each recorder 14 is spaced far enough away in time from the operation of the preceding recorder 14 to allow ample time for a complete record to be made by the preceding recorder at the maximum depth of intended use with an additional safety factor included.

After the last flotation flask 9 has risen from the bathythermograph and its recorder has been turned off the control timing mechanism 31 operates to activate the cable cutter release assembly 15 which severs the cables 12 so as to enable the instrument housing 7 which is surrounded by flotation material 10 to rise to the surface and be retrieved. The control timing mechanism 31 can be preset to activate the cable cutter release assembly 15 only after a reasonable time period has elapsed since the release of the last flask 9 so as to allow the hurricane or severe weather condition to pass. This reasonable period of time may be of any length, e.g. approximately two to four days.

The correspondence between depth and temperature as recorded by the recorders 14 may be determined from a standard graph which is developed from a number of ascents of the flotation flasks so as to accurately measure the flasks' rate of ascent in sea water.

An alternative method for initiating the release of the first flotation flask 9 by the control timing mechanism 31 would be a pressure (wave) sensor or an acoustic sensor that would activate the control mechanism 31 so as to energize the first flask release mechanism 25. The pressure (wave) sensor would be preset to respond to waves at the surface exceeding a predetermined height. For example, if the pressure sensor were set at a pressure equivalent to waves 20 feet in height, the control timing mechanism 31 would be started when hurricane force winds produced waves of 20 feet or more. Alternatively, an acoustic sensor may be used to activate the control timing mechanism 31 and in turn, the flask release mechanism 25. It would respond to a small explosive charge dropped by an aircraft or a ship to detonate at a depth near the bathythermograph. This could be done, for example, at a time just prior to the approach of a hurricane or other severe weather condition so that the ocean temperature could be measured at the critical time when the hurricane is passing by.

A recoverable instrument housing 7 and the flotation collar 10 are expected to be reusable several times. In addition, the bathythermograph might also be used as a floating surface buoy by eliminating the sinker 11 and by inverting the instrument housing 7 so that when the flasks 9 are released they are weighted sufficiently to be negatively buoyant in water so as to sink from the ocean's surface to the bottom.

This invention provides an apparatus which can obtain a series of ocean temperature measurements, the time of which can be preset into the apparatus so as to take place over any desirable time interval. The location of this apparatus on the ocean bottom permits the recording of vertical temperature gradients in the ocean from the bottom to the surface when surface weather conditions would not permit surface platforms, such as ships or buoys, to record the data accurately and satisfactorily. By use of a large number of the bathythermographs herein described it is possible to establish a prescribed network or pattern so as to accurately cover hurricane or storm tracks, thereby providing instrument records of ocean temperature, which records are critical and are now lacking in the field of hurricane research.

It should be understood that the foregoing disclosure relates only to preferred embodiments of the invention and that numerous modifications or alterations may be made therein without departing from the spirit and the scope of the invention.

What is claimed and desired to be secured by Letters Patent of the United States is:

1. A bathythermograph, comprising:
   a housing;
   a plurality of flasks releasably attached to said housing;
   a plurality of temperature sensors, each one affixed to a respective one of said flasks;

a plurality of recorders mounted within said housing each one electrically coupled to a respective one of said sensors;

a plurality of flask-release mechanisms associated with said flasks to release the flasks from the housing; and control timing means operatively associated to sequentially activate said recorders and said flask-release mechanisms at predetermined times.

2. A bathythermograph, comprising:

a housing;

a plurality of flasks releasably attached to said housing;

a plurality of temperature sensors, each one affixed to a respective one of said flasks;

a plurality of recorders each one electrically coupled to a respective one of said sensors;

a weight releasably attached to said housing; and a flotation collar attached to said housing to enable the housing to float when the weight is released therefrom.

3. The bathythermograph of claim 2, including a plurality of wire-filled spools, each one associated with a respective one of said flasks wherein the wire on each one of said spools electrically couples one of said sensors with one of said recorders.

4. The bathythermograph of claim 3, including a plurality of flask-release mechanisms associated with said flasks to release the flasks from the housing at predetermined times.

5. The bathythermograph of claim 4, including:

control-timing means operatively associated to activate said recorders and said flask-release mechanisms at predetermined times; and actuator means operatively associated to activate said control-timing means.

6. The bathythermograph of claim 5 wherein said actuator means comprises a release pin.

7. The bathythermograph of claim 5 wherein said actuator means comprises a pressure sensor.

8. The bathythermograph of claim 5 wherein said actuator means comprises an acoustic sensor.

9. The bathythermograph of claim 5, including a cable cutter release assembly coupled to said control-timing means and operative to sever said weight from said housing at a time determined by said control-timing means.

10. The bathythermograph of claim 9, including:

a depth sensor; and a depth recorder associated with said depth sensor and said control-timing means for recording the depth of the water at the point of operation of the bathythermograph.

11. The bathythermograph of claim 1, wherein said housing includes a plurality of depressions adapted to receive said plurality of flasks.

12. The bathythermograph of claim 11 wherein said housing and said flasks are water tight.

13. The bathythermograph of claim 12 wherein each of said plurality of flasks is positively buoyant in water so as to rise up from said housing when released therefrom underwater.

14. The bathythermograph of claim 12 wherein each of said plurality of flasks is negatively buoyant in water so as to sink from said housing when released therefrom underwater.

15. The bathythermograph of claim 1, wherein said plurality of flasks are hermetically attached to said housing by means of a sealant.

References Cited

UNITED STATES PATENTS

| | | | |
|---|---|---|---|
| 3,221,556 | 12/1965 | Campbell | 73—170 |
| 3,349,613 | 10/1967 | Francis | 73—170 |
| 3,359,801 | 12/1967 | Rasmussen | 73—344 |

LOUIS R. PRINCE, Primary Examiner

DENIS E. CORR, Assistant Examiner

U.S. Cl. X.R.

73—345, 343.5